No. 828,021. PATENTED AUG. 7, 1906.
I. S. DEMENT.
CASH RECORDER.
APPLICATION FILED AUG. 19, 1901.

Witnesses.
Wm A. Courtland
Wm P. Hammond

Inventor
Isaac S. Dement
by
Attys.

No. 828,021. PATENTED AUG. 7, 1906.
I. S. DEMENT.
CASH RECORDER.
APPLICATION FILED AUG. 19, 1901.

No. 828,021. PATENTED AUG. 7, 1906.
I. S. DEMENT.
CASH RECORDER.
APPLICATION FILED AUG. 19, 1901.

Witnesses:
Wm. A. Courtland
Wm. P. Hammond

Inventor
Isaac S. Dement
by Strique & Bros
Attys.

No. 828,021. PATENTED AUG. 7, 1906.
I. S. DEMENT.
CASH RECORDER.
APPLICATION FILED AUG. 19, 1901.

No. 828,021. PATENTED AUG. 7, 1906.
I. S. DEMENT.
CASH RECORDER.
APPLICATION FILED AUG. 19, 1901.

No. 828,021. PATENTED AUG. 7, 1906.
I. S. DEMENT.
CASH RECORDER.
APPLICATION FILED AUG. 19, 1901.

Witnesses.
Wm. A. Courtland
Wm. P. Hammond

Inventor.
Isaac S. Dement
by
Strange & Bros
Attys.

UNITED STATES PATENT OFFICE.

ISAAC S. DEMENT, OF NEW YORK, N. Y., ASSIGNOR, BY MESNE ASSIGNMENTS, TO CITY TRUST COMPANY OF NEW YORK, TRUSTEE, A CORPORATION OF NEW YORK.

CASH-RECORDER.

No. 828,021.     Specification of Letters Patent.     Patented Aug. 7, 1906.

Application filed August 19, 1901. Serial No. 72,588.

*To all whom it may concern:*

Be it known that I, ISAAC S. DEMENT, a citizen of the United States, residing at New York, in the county and State of New York, have invented certain new and useful Improvements in Cash-Recorders, of which the following is a specification.

This invention relates to improvements in cash-recorders, and relates particularly to improved means for producing a plurality of records at the same time.

It is in some cases desirable to produce in addition to a record on a record-ribbon concealed within the machine a separate record on a check slip or ticket, and this check-slip record may also be required to be printed in two or more places, so that a number of simultaneous impressions involving more or less of the same subject-matter are required. In order to produce such a plurality of impressions, I provide printing devices in the form of type-bars having sets of type or characters arranged in similar order in different parts of each bar, so that by simply shifting the bar all of the sets of type are simultaneously shifted to produce similar impressions. In connection with such printing devices I provide a plurality of platens or printing-hammers and means for operating the same simultaneously.

The invention is particularly intended to provide for the printing in two or more places of a slip to be inserted in the machine at each sale and for the cutting off of one of the printed parts of such slip, as a check, to be retained in the machine, while enabling the withdrawal of the remainder of the slip. The means for clipping the slip in this manner is operated by the platen-operating devices.

My invention also comprises improved inking means operated by the insertion and withdrawal of the slip. Such slip is preferably carried by a sliding table which enables its insertion in the machine in correct position and also serves to operate the inking devices and to actuate a gripper device for depositing the severed parts of the slip within the machine.

In the accompanying drawings, Figs. 15 and 16 are plan views of the slip-supporting table and coöperating devices, showing, respectively, the positions of the parts when the table is drawn out and when it is pushed in.

My invention is herein shown as applied to a machine comprising a keyboard mechanism controlling the movement of a plurality of spring-operated shafts connected to the respective type-bars, a handle serving through suitable connecting mechanism to reset the operating-shaft and the type-bars. All parts of the machine are supported on a suitable frame 1, and a suitable casing (not shown) is also provided.

Figure 10:
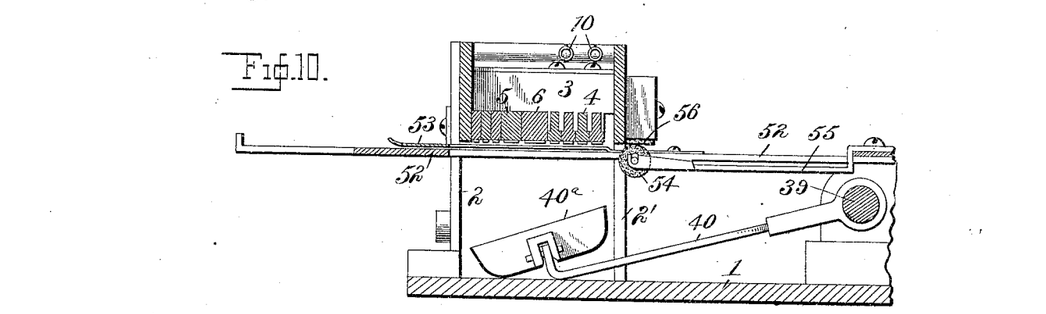
Fig. 10 is a section on the line $b\,b$ in Fig. 2, showing the printing-hammer and inking devices.
Figure 11:
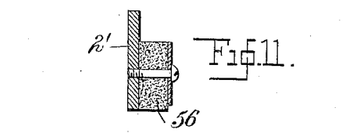
Fig. 11 is a detail of a stationary inking-pad for the inking devices.

Near the front of frame 1 are two vertical frame-plates 2 and 2', with horizontal cross-bars 3 and cross-plates 3', supporting and guiding the recording type-bars, numbered 4, 5, and 6, which are placed side by side between said frame-plates and cross-pieces, so as to be capable of sliding lengthwise. Cross-bars 3 have dependent combs, as shown, entering between the numeral-bars 4, to guide the same accurately, the sides of these bars being cut away, as shown in Fig. 10, to receive such combs. A fixed type-bar 7 at one side of the series of movable type-bars carries type for marking on the slip the number of the machine. The type are on the under side of all the printing-bars 4, 5, 6, and 7. The numeral type-bars, of which four are here shown, are each provided on their upper sides with rack-teeth engaging pinions 8 on the operating or controlling shafts 9, suitably journaled in the frame. Springs 10, attached to these bars 4, tend to draw alternate bars in opposite directions toward the respective sides of the machine. These rack portions are arranged on the type-bars directly opposite the type-bearing portions—that is, between the same limits longitudinally of the bars—so that the bars need be no longer than is required for bearing the necessary type, and the machine is thereby rendered as compact as possible.

The keyboard mechanism comprises keys 11, arranged in sets, each set controlling, through a suitable stop-bar 12, the release of the corresponding shafts 9, which when so released allows the type-bar connected thereto by pinion and rack to move under the action of its spring 10 until the shaft is arrested by stop devices 13 thereon engaging with the depressed key. On the rear ends of shafts 9 are pinions 15, engaging resetting-racks 16, sliding in fixed guides and engaged by arms 17 on a sleeve 18, loosely mounted on a resetting-shaft 20, but connected thereto by a pawl engaging with a ratchet 21. Shaft 20 carries a pinion 22, engaged by a rack on the lower part of a bar 23, guided in a bracket 24 and pivoted to and depending from one arm of a lever 25, which is pivoted to a fixed frame-standard and has at its other end a segment-gear 26, engaged by a pinion 27' on the shaft of handle 27. The pinion 27' is mutilated, so that normally it is free of segment-gear 26; but when the handle is turned the pinion engages the segment and causes the bar 23 to rise, turning the shaft 20 and through the arms 17 resetting the racks 16, shafts 9, and type-bars 4. A spring 28 serves to return the bar 23, shaft 20, and lever 25 to normal position when released by the blank part of gear 27' coming around to the starting-point; but the resetting-sleeve 18 does not partake of this movement, as the ratchet 21 slips under its pawl. Type-bars 4 are provided on their under sides with numeral-types from "0" to "9," arranged in three series or sets in different longitudinal positions thereon, so as to print in three places, as hereinafter described, these type being arranged in opposite order on adjacent bars on account of their opposite movement.

Bars 5 are date-printing bars and are provided on their under sides with type for the month and the day numerals, arranged in four places on each bar. Racks on the upper side of these bars are engaged by pinions 29, operated by handles or thumb-wheels 30 to set the bars to the proper date. The special bar 6 is provided on its under side with type for recording the character of the purchase, whether "paid," "C. O. D.," &c. By means of a pinion 31, operated by a handle or knob 32 and engaging with a rack 6' on the top of this bar, it may be set to print any one of these special marks. All the hand-wheels 30 32 are provided on their edges with marks corresponding with the marks on the type-bars 5 and 6, the presence of a mark at the top of a wheel indicating that a corresponding type is in printing position. To insure that these bars will be exactly positioned and held, I provide snap-detents or spring-pins $3^a$ in one of the cross-bars 3, engaging with notches $5^a$ $6^a$ in the top of the respective bars.

A shaft 34 is connected to the resetting-sleeve 18 by gears 35 36 37 and carries a mutilated gear 33. Bar 6 has a rack 6'', which when the bar is moved from normal position comes over the mutilated part of the gear, so that when the gear is turned by the operation of handle 27 and shafts 20 and 34 it will engage this rack and move the bar back to normal position, the bar thus moving clear of the pinion, so that unless the bar is moved from normal position it will not be engaged by the gear. The blank part of gear 33 is normally down, so that the bar 6 may be freely moved by its handle without interference from said gear. The fixed type-bar 7 is provided on its under side with the machine number or other designating-mark in four places. The above-described arrangement of type-bars is adapted to print in four places, except for the purchase-numerals, which are only printed in three places. The printing points or lines at which printing is effected are indicated by dotted lines $a'$ $b'$ $c'$ $d'$, the type which are to be printed being presented at these points.

Resetting-sleeve 18 and shaft 34 are each operated one complete rotation at each operation of the handle 27, and the rotative movement of each is always in one direction, the said sleeve and shaft not partaking of the back movement of shaft 20. Shaft 34 also serves to operate the printing-hammers and to actuate the feed for the several stops and the cut-off device for the check-slip. The hammer-shaft 39 extends parallel to the printing-bars and to the rear of same and is provided with four hammer-arms 40, carrying the printing-platens $40^a$, located at the respective printing-points $a'$ $b'$ $c'$ $d'$. An arm 41 on shaft 39 is engaged by a spring 42, which tends to turn said shaft to throw the platens or hammers against the type-bars, and a cam 43 on shaft 34 normally engages by its most projecting part with said arm 41 to hold the hammers away from the type-bars. When the main handle 27 is operated, its first movement through the connections above described causes cam 43 to turn to carry such projecting part away from the arm 41, which is then actuated by spring 42 to lift the hammers, giving a sharp quick blow for impression before the further movement of the handle 27 and shaft 20 begins to move the type-bars in resetting.

Figure 3:
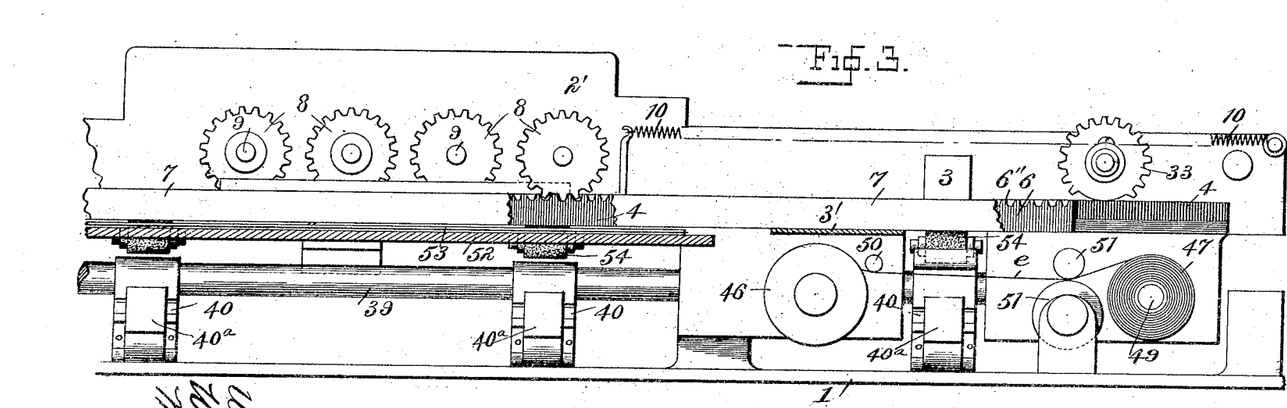
Figs. 3 and 4 are front views, respectively, of the right and left portions of the recording mechanism with the front plate broken away.
Figure 4:
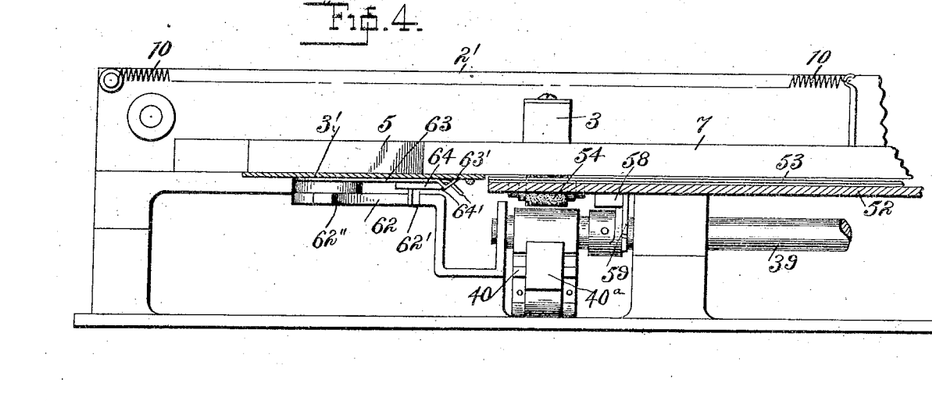
Figure 5:
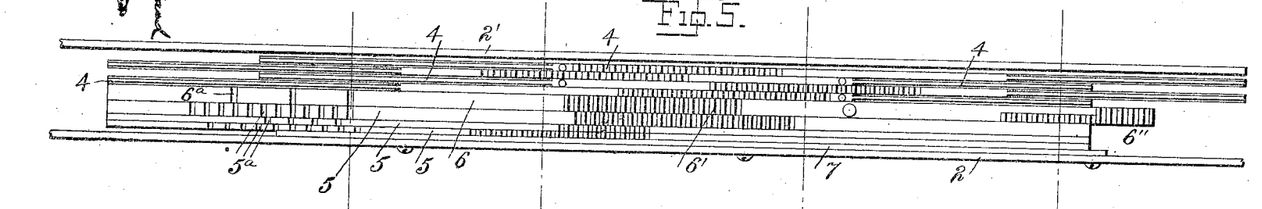
Fig. 5 is a plan view of the recording type-bars.
Figure 6:
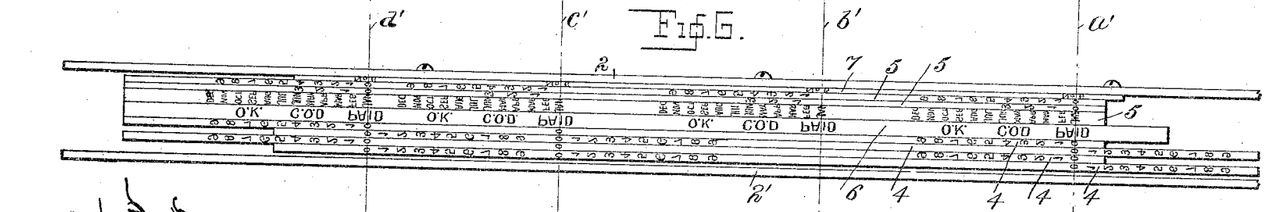
Fig. 6 is an under side view thereof.
Figure 7:
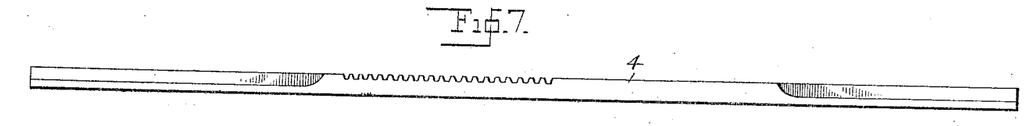
Figs. 7 and 8 are side views (the latter partly in section) of certain of the type-bars.
Figure 8:
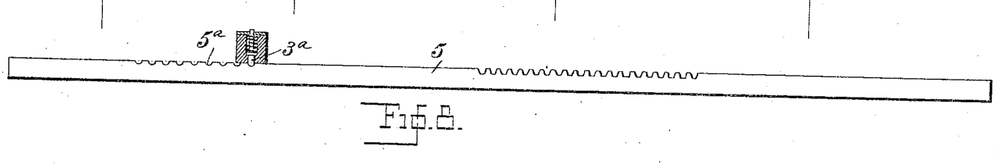

The record-strip e (see Fig. 3) is carried on rolls 46 47 and is fed from the roll 46 to the roll 47 by a belt 48, preferably elastic, connecting a pulley on the shaft 34 with a pulley on the shaft 49 of roll 47. The paper strip e passes under guide 50 through guide-rolls 51, which normally hold it away from the type-bar sufficiently to permit the inking-roller, hereinafter mentioned, to pass between it and the type-bars.

Figure 15:
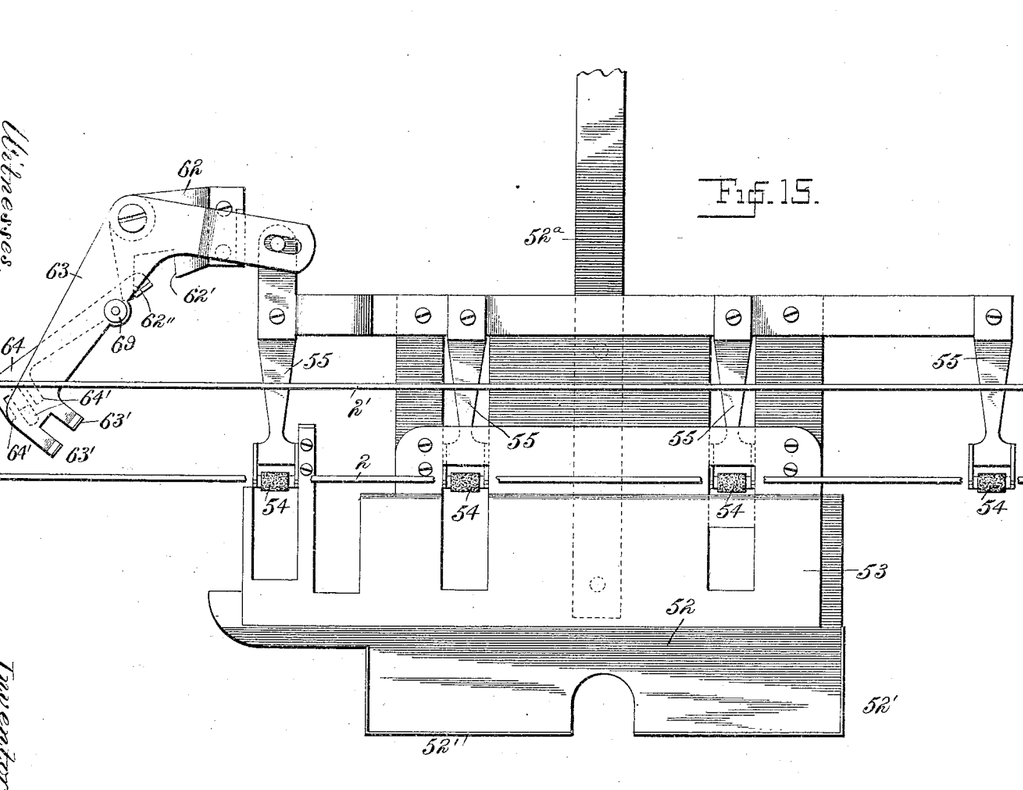
Figure 17:
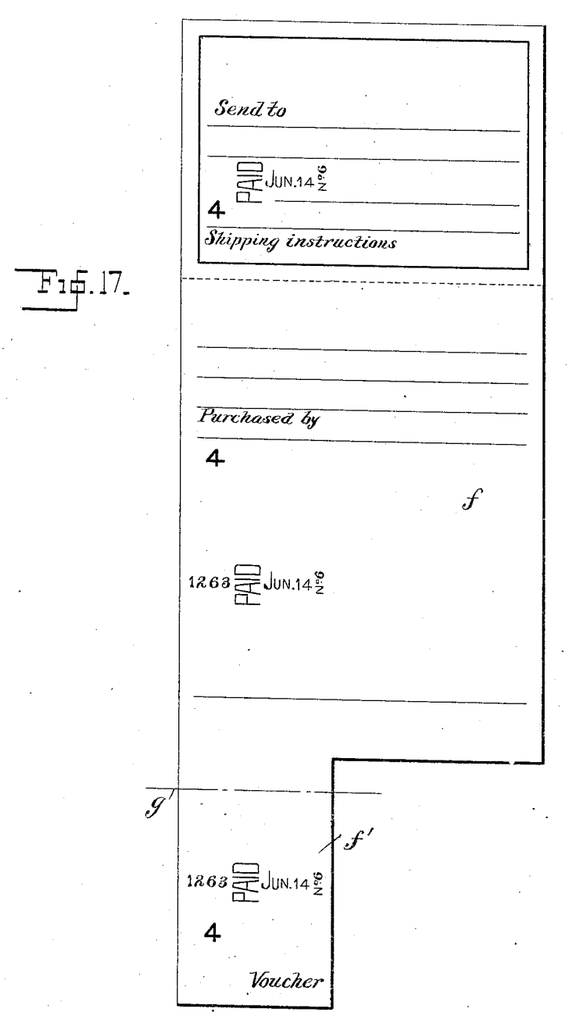
Fig. 17 shows the insertible check-slip with its projecting coupon unsevered.

As above stated, this machine is intended particularly for making a plurality of impressions on an insertible record-slip or check-slip. This slip is shown in Fig. 17 and has a main portion f and a projecting coupon or voucher portion f', which is eventually severed along the line g in that figure, and is retained in the machine when the main slip f is withdrawn. To facilitate the insertion of the slip, I provide a sliding table 52, guided in a slot in frame-plate 2', and with a rearwardly-projecting tongue 52ª, engaging a fixed guide 51 on the frame of the machine 1, said table being adapted when fully drawn out to the position shown in Fig. 15 to receive the slip f f', which is deposited on said table and beneath the spring-plate 53, which is attached to the table or carrier 52 and serves not only to hold the slip down and to enable it to be pushed in without catching, but also, in common with raised flanges 52' around the edge of table 52, serves as a gage to properly position the slip. The table or carrier 52 and its spring-plate 53 are cut away or slotted, as shown, to provide for the passage and operation of the printing-plates and the cut-off devices. In line with the four impression-points are provided four inking-rolls 54, carried by spring-arms 55 on the table 52, said rolls when the table is pushed in resting under pads 56 secured to the frame-plate 2' and containing inking liquid. Each time the table is pulled out these rolls pass under and in contact with the type which have been set to the printing-lines and ink them, and a second inking action occurs on the backward movement of the table.

Figure 9:
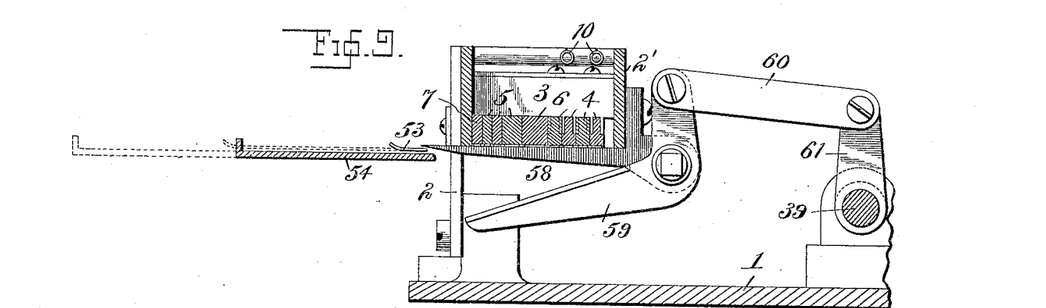
Fig. 9 is a transverse section on the line $a\,a$ in Fig. 2, showing the check-severing device.

Simultaneously with the impression the shaft 39 operates to cut off the coupon or voucher f', which when the table is pushed backward enters between a fixed jaw or blade 58 in Fig. 9 directly below the printing-bars and a shear-blade 59, pivoted to the frame-plate 2' and normally held downward or open by a link or bar 60, connecting an arm on said blade with an arm 61 on shaft 39. When the shaft 34 is operated, as above described, to effect the impressions this connection 61 60 operates to close the shear-blades 58 59 and cut the slip which was presented between them. The coupon so cut off is to be retained in the machine, and to insure this I provide gripper mechanism operated, preferably, by the withdrawal of the slip-carrier or table 52.

Figure 12:
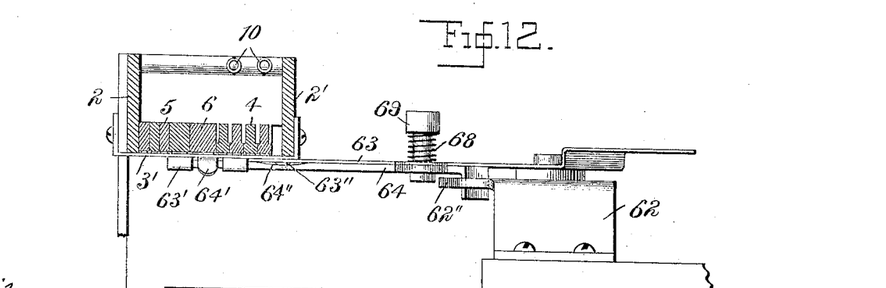
Fig. 12 is a section on the line $c\,c$ in Fig. 2, showing the check-gripper devices.
Figure 13:
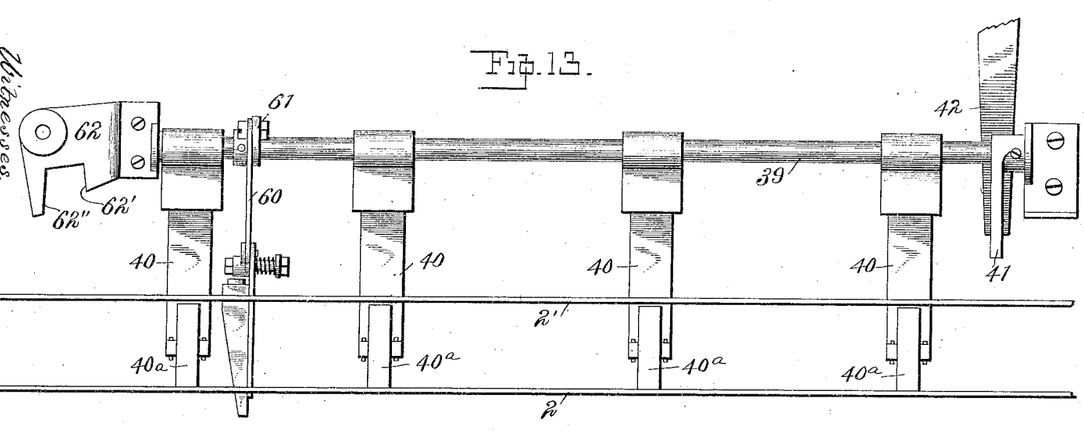
Fig. 13 is a plan view, and Fig. 14 a front view, of the printing-hammer mechanism.
Figure 14:
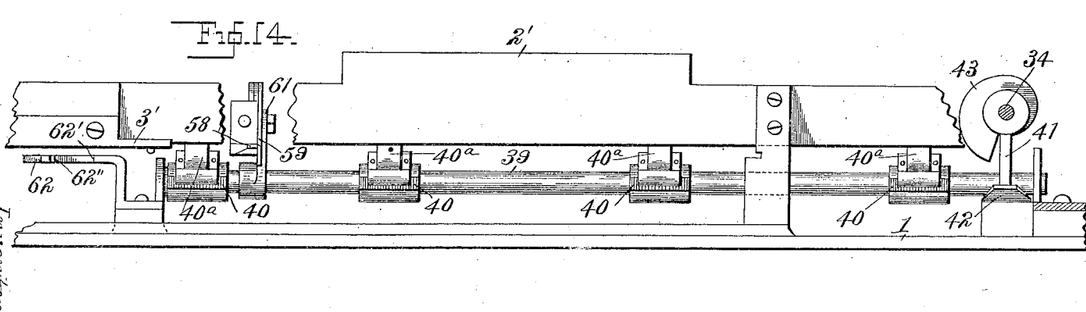
Figure 16:
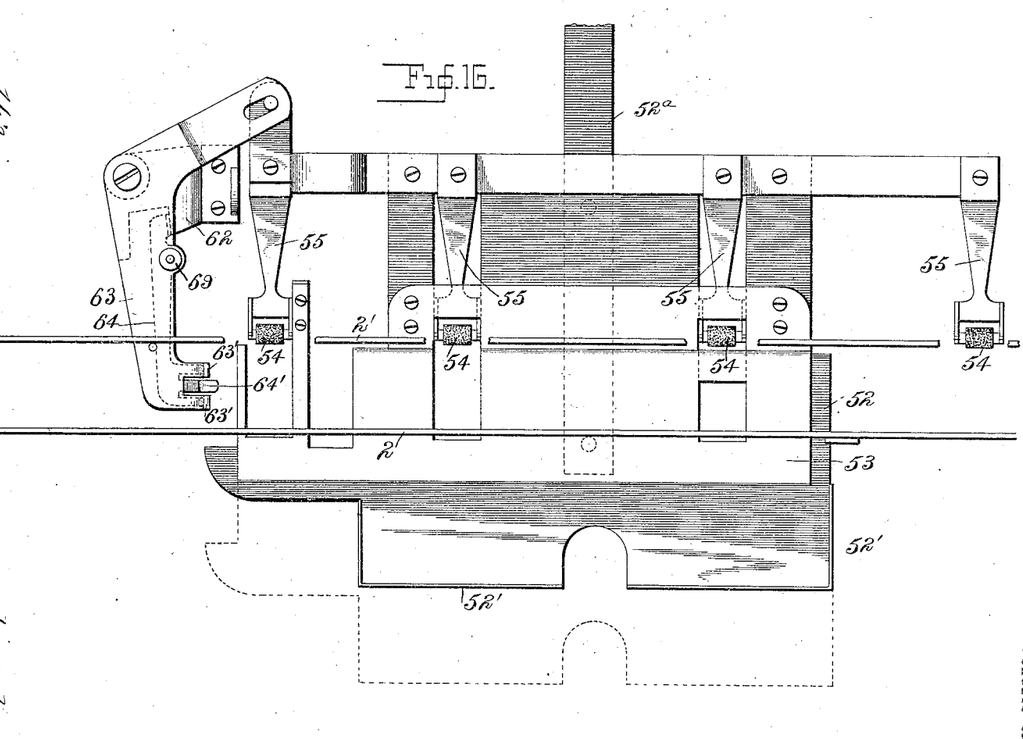

The gripper mechanism consists of a lever 63, pivoted to a fixed bracket 62 and pivotally connected by one arm to a part of the sliding table 52, so as to be operated by the movements of the latter. On the other arm of lever 63 are provided spring gripper-fingers 63', which coöperate with finger 64' on a clamp-lever 64, pivoted to lever 63 and engaging by its tail with projections or shoulders 62' 62" on bracket 62, so that as the lever 63 moves to bring its gripping end into the gripping position (shown in Fig. 16) the shoulder 62' will engage the tail of subsidiary lever 64 to cause its gripper-finger to approach and close with the fingers of lever 63, while on the opposite movement of lever 63 the tail of lever 64 will strike shoulder 62", and the said lever 64 will be swung over to the position shown in Fig. 15. The gripping-fingers 63' 64' are preferably formed to interlock, as shown in Figs. 12 and 16, so as to more securely grip the paper, the middle finger 64' extending up between the two fingers 63'. In order to move the finger 64' downward when the lever 63 is moving forward and back, and thereby more easily engage and free the coupon, I provide subsidiary lever 64 with a cam-face or convex portion 64", its top engaging with a cam or hump 63" on the bottom of lever 63 in the relative movement of the levers to cause depression of lever 64 and its finger 64', a spring 68 on the pivot-stud 69 connecting said levers, allowing of this movement. This movement is transverse to the plane of pivotal motion of the levers and allows the fingers to separate laterally as they are being brought into position over the coupon, and thus enable them to pass, respectively, above and below the coupon, and then, the cam-faces having passed, the fingers come together and nip the coupon.

Figure 1:
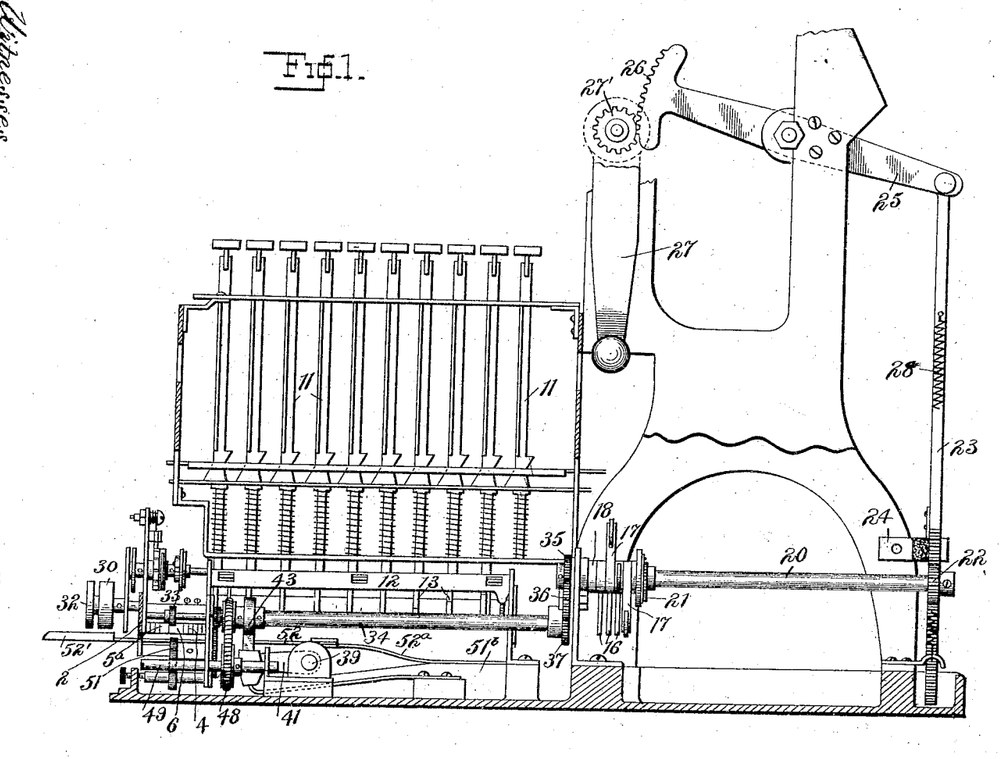
Figure 1 is a side elevation of the recording-machine and its operating devices, parts of the supporting-frame being broken away.
Figure 2:
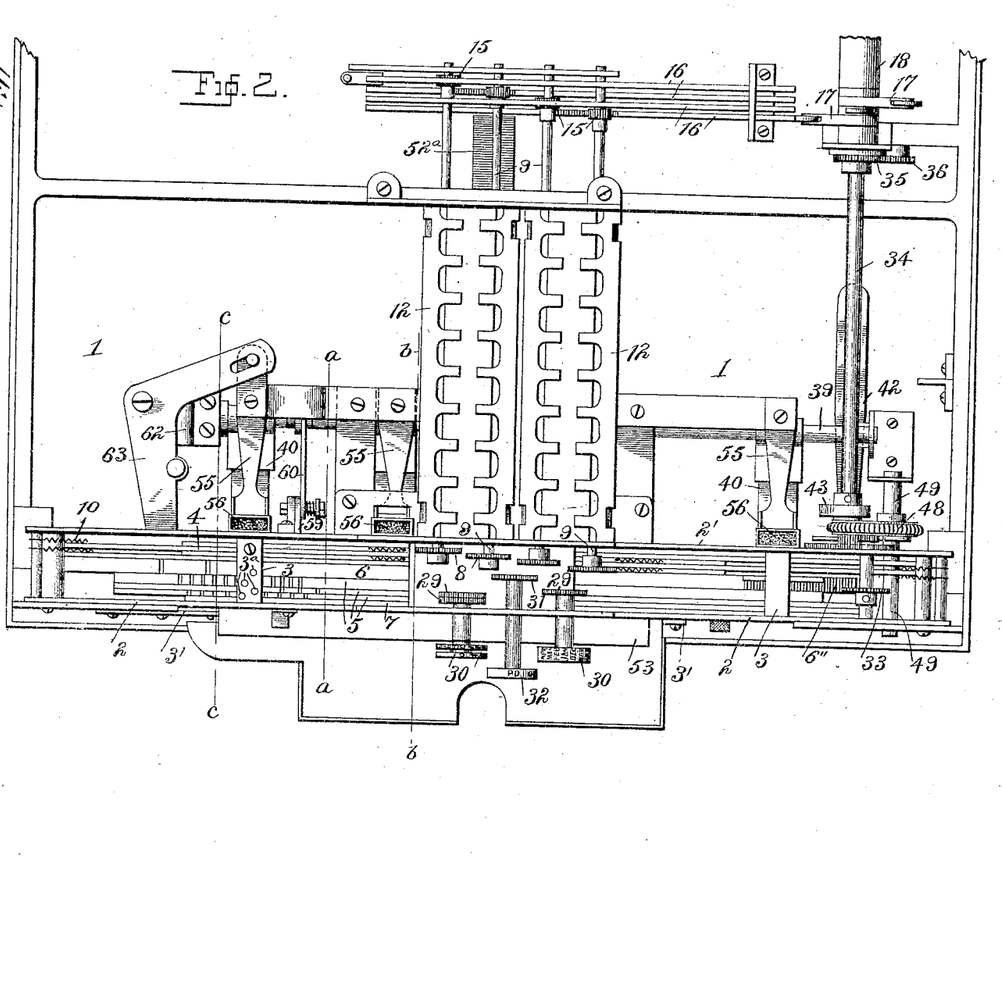
Fig. 2 is a plan view of the same with the keyboard and frame parts removed.

The operation of the machine is as follows: The date-bars are assumed to have been set for the proper date, and at each purchase the operator strikes the keys on the keyboard corresponding to the purchase. This operation causes one or more of the rack-bars 4 to be released and moved by their springs until stopped in position bringing the numbers opposite the printing-points corresponding to the purchase. If the sale is "cash" or "paid," the operator does not move the special bar; but if the sale is special, as a "charge" (O. K.) or "collect" (C. O. D.) he turns the knob 32 until the desired mark appears on the top of the knob and the snap detent engages the bar, when the corresponding type will be at the printing-point. Having set the requisite type-bars in this manner, the operator draws out the table or carrier 52 and places a record-slip $f$, with its attached voucher or coupon $f'$, on said table, the gages above described serving to properly position the slip. He then pushes the table in as far as it will go. The type are twice inked by the above operation, as already described, and the gripper 63 64 is caused to swing around and take hold of the coupon. The operator then moves the handle 27 in the direction of the arrow in Fig. 1 one complete return, thereby first lifting and then releasing the bar 23. In the upward movement of the bar 23 the shafts 20 and 34 are operated, and as soon as shaft 34 starts to rotate it allows the arm 41 to move off the projecting part of cam 43, tripping the spring-operated hammer-shaft 39 and causing simultaneous sudden upward movement of all the hammers, with consequent impressions in four different places—namely, on the record-strip $e$, on the main slip $f$ in two places, (one of which, however, does not include the purchase-numerals,) and on the coupon. At the same time the cutting-off device 59 58 is operated by this motion of shaft 39 to clip off the coupon $f'$, which is still held by the gripper device. In the further upward movement of the bar 23 the shaft 34 causes the feed device for the record-strip to operate, bringing a new part of the record-strip to position for printing. This continued rotation of shaft 34 and the cam 43, carried thereby, causes the printing-hammer shaft to be gradually turned back against the action of spring, thereby removing the printing-hammers from the type-bars and also opening the cutting-off shear-blade 59. The operator then pulls out the table 52 and removes the record-slip, on which by the above operations the date and special mark have been printed in two places and the amount of purchase in one place. The matter so printed may, however, be varied according to requirements. The withdrawal of the table or carrier 52 also causes the gripper levers 63 64 to swing back and at the same time open, as above described, so as to drop the cut-off coupon or voucher into a part of the machine adapted to receive such coupons.

Having thus described my invention, the following is what I claim as new therein and desire to secure by Letters Patent:

1. In a recorder, the combination with guiding means, of printing-bars sliding side by side thereon and having printing-type on one side and racks on the other side, operating-springs connected to said bars, pinions engaging said racks, controlling-shafts connected with said pinions, keyboard mechanism controlling said shafts, and resetting devices for said shafts.

2. The combination with the recording type-bars having type arranged in a plurality of sets on one side of each of the bars, and means on the other side of said bars for reciprocating the same, of a plurality of platen devices adapted to coöperate with the respective sets of type.

3. The combination with the recording type-bars having type arranged in a plurality of sets on one side of each of the bars, means on the other side of said bars for reciprocating the same, and a plurality of printing-platens adapted to coöperate with the respective sets of type, of means for simultaneously operating all of said platens.

4. The combination with the printing-platen and the cut-off jaw, the shaft connected to operate said platen and jaw, and having an operating-arm, and a spring tending to turn the shaft to move the platen and jaw to operating position, of a cam bearing on the arm on said shaft and tending to move the hammer and jaw away from operating position, said cam having a shoulder off which said part may pass to give a sudden movement to the platen and jaw, and means for actuating said cam.

5. The combination of type-carrying bars, means for setting the same in printing position; a slip-support having means for gaging and retaining the slip and movable to an exposed position to receive the slip and to position for printing; a spring-operated printing-hammer; a shouldered cam retracting the hammer and releasing it with a sudden movement to produce the impression; a handle and connecting means by which said cam is rotated; and resetting mechanism operated by the said handle after the hammer is tripped, substantially as described.

6. The combination with the type-bars having type arranged in a plurality of sets on one side of said bars and in different longitudinal positions thereon, and a plurality of platen devices, of means for carrying a record-strip in position to be printed upon by one set of type and platen devices and means for inserting a slip in position to be printed upon by another set of type and platen devices.

7. The combination with the recording type-bars, means for operating said bars and a printing-platen; of the sliding table 52 having a guiding-tongue $52^a$ and gage-flanges $52'$ and spring-plate 53 to position and retain a paper slip placed on said table, and means in the machine-frame serving to guide said sliding table as it is pushed in to bring the paper slip into printing position between the type-bars and printing-platen, substantially as described.

8. The combination with the recording type-bars having type arranged in a plurality of sets, and a plurality of printing-platens, of means for carrying a removable printing-slip into and out of position to be printed on by a plurality of such sets of type and platens.

9. The combination with the recording-type-bars having type arranged in a plurality of sets, and a plurality of printing-platens, of means for carrying a removable printing-slip into and out of position to be printed on by a plurality of such sets of type and platens, and cutting-off means for severing said slip between two of the printed parts thereof.

10. The combination with the recording-type devices and the printing-platen, means for inserting a slip in the machine to enable a coupon portion thereof to be printed on by said type devices and platen, cutting-off means for severing said coupon portion, and gripper means adapted and arranged to take hold of said coupon portion and to retain same when the slip is removed.

11. The combination with the recording-type devices and the printing-platen, of a movable support adapted to insert a slip in the machine to enable a coupon portion of said slip to be printed on by said type devices and platen, cutting-off means for severing said coupon portion, and gripper means adapted to grip and subsequently release the coupon, said gripper means being connected to the movable support and operated thereby to grip and release the coupon as the said support moves to insert and withdraw the slip.

12. The gripper mechanism for the purpose set forth, comprising a main gripping-lever, a subsidiary gripping-lever pivoted to the main gripping-lever, and a fixed abutment engaging with the subsidiary lever, in the movement of the main lever to cause the fingers to approach and recede from one another.

13. The combination of the main gripping-lever, the subsidiary gripping-lever pivoted thereto, means for moving the main gripping-lever and means operated by the movement of such main lever to cause the subsidiary lever to move relatively to the main lever to open and close the gripping parts.

14. The gripping mechanism comprising main and subsidiary levers, means for causing relative pivotal movement of said levers, and cam devices carried by the levers to move the gripping parts of the levers relatively to one another by a movement transverse to the pivotal movement.

15. The gripping mechanism comprising the main lever, the subsidiary lever pivoted thereto, and cam parts on the two levers engaging in the relative pivotal movement of the levers to cause the gripper parts of the levers to move transversely to the plane of pivotal motion of the levers.

16. The gripping mechanism comprising pivoted gripping-levers and means for causing movement of one of said levers transversely to the pivotal movement of the levers, to open and close the gripping parts.

17. The combination with the numeral-printing bars, of a special printing-bar parallel thereto, provided on one side with type for special marks, and on the other side with notches and with a rack, a handle mechanism comprising a pinion engaging said rack, and spring-detent mechanism engaging the notches in said bar for the purpose set forth, and printing-platen means coöperating with all of said bars.

18. The combination with the date-printing bars, provided on one side with type, and on the other side with notches and with racks, of handle devices comprising pinions engaging said racks, and spring-detents engaging the notches in said bars, for the purpose set forth.

19. The combination with the plurality of parallel type-bars, each having a plurality of sets of type, of a plurality of inking-rolls for the respective sets of type and a movable support for all of said rolls.

20. The combination with the plurality of parallel type-bars each having a plurality of type on its under side, arranged in sets, of a plurality of inking-rolls for the respective sets of type, ink-supply devices under which said inking-rolls normally rest, and a carrier connected to and moving all said inking-rolls simultaneously.

21. The combination with the plurality of parallel type-bars, each having a plurality of sets of type, of a plurality of inking-rolls for the respective sets of type and a movable support for all of said rolls, said movable support being also adapted to receive a slip and to move same into position to be printed on by the type.

22. The combination with the recording-type bars having type arranged in a plurality of sets, and means on the other side of said bars for operating the same, of a shaft, a plurality of printing-hammers carried thereby and coöperating with the respective sets of type on the bars, and means for operating said shaft.

23. The combination with the recording-type bars having type arranged in a plurality of sets, and means for operating said bars, of a shaft, a plurality of printing-hammers carried thereby and coöperating with the respective sets of type on the bars, and means for operating said shaft, comprising a cam, an arm carried by said shaft and bearing on said cam, and a spring tending to move the printing-hammers to printing position against the action of the cam.

24. The combination of a paper-support, a series of type-bars sliding longitudinally, and independently adjustable, means for guiding the movement of certain of said type-bars and a plurality of corresponding sets of fixed printing characters carried by each bar and repeated at intervals longitudinally of said bar.

25. The combination of a series of parallel type-bars, sliding longitudinally, and independently adjustable, means for guiding the movement of certain of said bars, a plurality of corresponding sets of printing characters on one face of and forming a fixed part of each bar, arranged longitudinally thereof and repeated at intervals in the length of the bar and suitable means for inking said characters and for impressing paper thereon.

ISAAC S. DEMENT.

Witnesses:
J. C. FAIRCHILD,
LOMBARD WILLIAMS.